(12) United States Patent
Ujibashi

(10) Patent No.: US 11,385,870 B2
(45) Date of Patent: Jul. 12, 2022

(54) NON-TRANSITORY COMPUTER-READABLE RECORDING MEDIUM, DATA TRANSFORMATION DEVICE, AND DATA TRANSFORMATION METHOD

(71) Applicant: FUJITSU LIMITED, Kawasaki (JP)

(72) Inventor: Yoshifumi Ujibashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 17/179,455

(22) Filed: Feb. 19, 2021

(65) Prior Publication Data

US 2021/0365249 A1 Nov. 25, 2021

(30) Foreign Application Priority Data

May 21, 2020 (JP) .............................. JP2020-088877

(51) Int. Cl.
*G06F 9/44* (2018.01)
*G06F 8/36* (2018.01)
*G06N 5/00* (2006.01)
*G06F 8/41* (2018.01)

(52) U.S. Cl.
CPC .............. *G06F 8/36* (2013.01); *G06F 8/447* (2013.01); *G06N 5/003* (2013.01)

(58) Field of Classification Search
None
See application file for complete search history.

(56) References Cited

U.S. PATENT DOCUMENTS

| | | | |
|---|---|---|---|
| 2017/0235599 A1* | 8/2017 | Raghu | G06F 9/4881 718/102 |
| 2018/0239593 A1* | 8/2018 | Miyamoto | G06F 8/30 |
| 2019/0079735 A1 | 3/2019 | Noma | |
| 2019/0278785 A1 | 9/2019 | Ujibashi et al. | |
| 2019/0325316 A1* | 10/2019 | Anderson | G16H 50/30 |
| 2021/0011926 A1* | 1/2021 | He | G06F 16/90344 |
| 2021/0019125 A1* | 1/2021 | Shi | G06F 16/24 |

FOREIGN PATENT DOCUMENTS

| | | |
|---|---|---|
| JP | 2019-049815 A | 3/2019 |
| JP | 2019-159362 A | 9/2019 |

OTHER PUBLICATIONS

Gulwani et al., programming by examples (Year: 2016).*
He et al., Transform-Data-by-Example (TDE): An Extensible Search Engine for Data Transformations, VLDB Endowment (Year: 2018).*

(Continued)

*Primary Examiner* — Insun Kang
(74) *Attorney, Agent, or Firm* — Fujitsu Patent Center

(57) ABSTRACT

A non-transitory computer-readable recording medium storing a data transformation program that causes a processor to execute a process. The process includes generating a plurality of first programs, each of the first programs transforming first input data and outputting first output data, contents of the transforming by the plurality of the first programs being different from each other, and among a plurality of pieces of a second input data different from the first input data, outputting the second input data that maximizes an entropy of a plurality of pieces of second output data, where each of the first programs transforms the second input data to the second output data.

6 Claims, 19 Drawing Sheets

(56) References Cited

OTHER PUBLICATIONS

Feser et al., Synthesizing Data Structure Transformations from Input-Output Examples, ACM (Year: 2015).*
Zhongjun Jin et al., "Foofah: Transforming Data By Example", Proceedings of the 2017 ACM International Conference on Management of Data, pp. 683-698, May 14-19, 2017, Association for Computing Machinery (Total 16 pages).

* cited by examiner

FIG. 1

Table 1:

| ID | DATE AND TIME | BOARDING STATION |
|---|---|---|
| 0123 | 8/1 16:00 | SHINJUKU |
| 2342 | 8/1 17:55 | 0000 |
| 6734 | 8/3 13:15 | YOKOHAMA |
| 3852 | 8/4 20:18 | SHINJUKU |

Table 2:

| DATE | STATION NAME | GENDER | AGE |
|---|---|---|---|
| 8/1 | SHINJUKU | FEMALE | 23 |
| 8/1 | null | MALE | 45 |

FIG. 9A

| $P_1$ | $P_2$ | $P_3$ | $P_4$ | $P_5$ |
|---|---|---|---|---|
| ichiro | ichiro | ichiro | ichiro | ichiro |

27 -- ichiro@jp.fujitsu.com         28 ... (each cell)

ENTROPY $H(P) = -(5/5) * \log(5/5) = 0$

FIG. 9B

| $P_1$ | $P_2$ | $P_3$ | $P_4$ | $P_5$ |
|---|---|---|---|---|
| 123456 | 12345678@jp.fujitsu.com | 12345678@jp.fujitsu.com | jp | jp |

27 -- 12345678@jp.fujitsu.com

ENTROPY $H(P) = -(1/5) * \log(5/5) - (2/5) * \log(2/5) - (2/5) * \log(2/5) \approx 1.05492$

FIG. 12

<A* ALGORITHM>

S1. ADD S TO OPEN LIST.
S2. IF OPEN LIST = ϕ, SEARCH FAIL. IF OPEN LIST ≠ ϕ, SPECIFY n-TH INTERMEDIATE NODE HAVING SMALLEST f'(n).
S3. IF n = G, SEARCH END. IF n ≠ G, ADD n-TH INTERMEDIATE NODE TO CLOSE LIST.
S4. EXECUTE P1 TO P2 TO ALL INTERMEDIATE NODES ADJACENT TO n (m = EACH ADJACENT INTERMEDIATE NODE).
   P1. CALCULATE f'(m) = g(n) + cost(n, m) + h(m)
       WHEREIN cost(n, m) = MOVING COST FROM n TO m.
   P2. EXECUTE Q1 to Q3 to m.
       Q1. IF m IS NOT INCLUDED IN EITHER OPEN LIST OR CLOSE LIST,
           SUBSTITUTE f'(m) IN f(m), ADD m TO OPEN LIST, AND RECORD n AS PARENT OF m.
       Q2. IF m IS INCLUDED IN OPEN LIST AND f'(m) < f(m) IS SATISFIED,
           SUBSTITUTE f'(m) IN f(m), REPLACE PARENT OF m WITH n.
       Q3. IF m IS INCLUDED IN CLOSE LIST AND f'(m) < f(m) IS SATISFIED,
           SUBSTITUTE f'(m) IN f(m), ADD m TO OPEN LIST, REPLACE PARENT OF m WITH n.
S5. REPEAT S2 AND SUBSEQUENT STEPS

NON-TRANSITORY COMPUTER-READABLE RECORDING MEDIUM, DATA TRANSFORMATION DEVICE, AND DATA TRANSFORMATION METHOD

CROSS-REFERENCE TO RELATED APPLICATION

This application is based upon and claims the benefit of priority of the prior Japanese Patent Application No. 2020-088877 filed on May 21, 2020, the entire contents of which are incorporated herein by reference.

FIELD

A certain aspect of the embodiments is related to a non-transitory computer-readable recording medium, a data transformation device and a data transformation method.

BACKGROUND

There is a PBE (Programming By Example) as a technology in which a computer automatically generates a program. The PBE is a technology in which the computer automatically generates the program for obtaining output data from input data by giving an example of a combination of the input data and the output data to the computer. According to this technology, it is not necessary for a user to manually generate the program, and it is possible to reduce a burden on the user.

In the PBE, the program may output the output data different from data desired by the user for the input data different from data given to the computer in order to generate the program. In this case, the number of examples of combinations of the input data and the output data is increased, and further the PBE regenerates the program.

However, when the number of examples of combinations of the input data and the output data is increased blindly, the output data desired by the user cannot be obtained. Therefore, the computer needs to generate the program many times by the PBE until the output data desired by the user is obtained, which wastes computational resources of the computer. Note that the technique related to the present disclosure is disclosed in Japanese Laid-open Patent Publications No. 2019-049815 and No. 2019-159362, and a Non-Patent Document 1 "Jin, Zhongjun et al., "Foofah: Transforming Data By Example", Proceedings of the 2017 ACM International Conference on Management of Data, pages 683-698, 2017, Association for Computing Machinery".

SUMMARY

According to an aspect of the present disclosure, there is provided a non-transitory computer-readable recording medium storing a data transformation program that causes a processor to execute a process, the process including: generating a plurality of first programs, each of the first programs transforming first input data and outputting first output data, contents of the transforming by the plurality of the first programs being different from each other; and among a plurality of pieces of a second input data different from the first input data, outputting the second input data that maximizes an entropy of a plurality of pieces of second output data, where each of the first programs transforms the second input data to the second output data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a schematic diagram when a program is generated by the PBE (part 1);

FIGS. 9A and 9B are schematic views illustrating an entropy;

FIG. 12 is a schematic diagram illustrating the A* algorithm;

DESCRIPTION OF EMBODIMENTS

Figure 2:
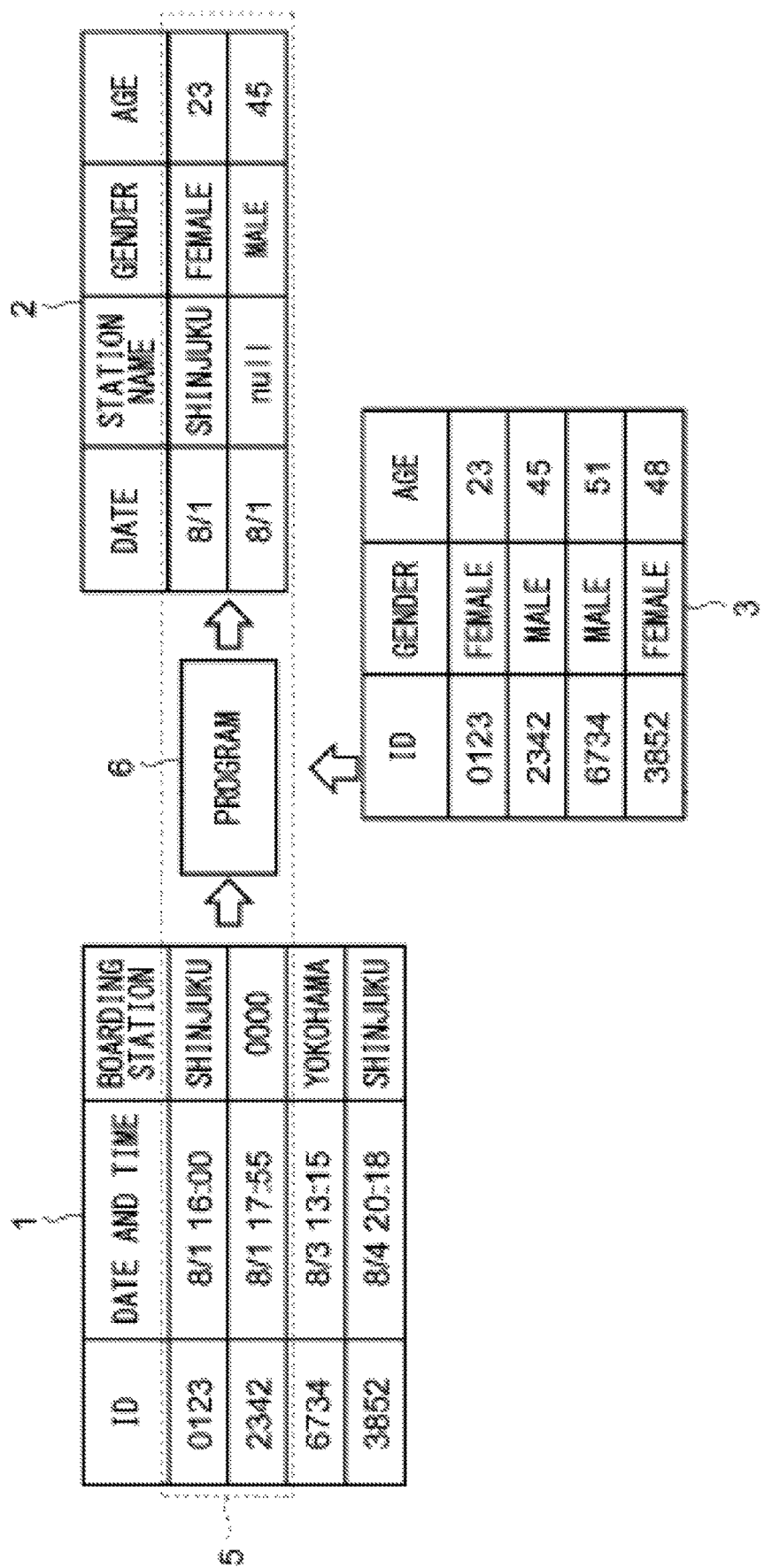
FIG. 2 is a schematic diagram when the program is generated by the PBE (part 2)

Prior to the description of the present embodiment, matters studied by an inventor will be described. FIGS. 1 and 2 are schematic diagrams when a program is generated by the PBE.

This embodiment describes a case where a computer automatically generates a program for transforming an input table 1 and outputting an output table 2 using the PBE, as illustrated in FIG. 1.

The input table 1 is, for example, a table illustrating boarding histories of transport facilities, and is the table in which an ID of a user, date and time of boarding, and a boarding station are associated with each other.

The output table 2 is a table illustrating when and what kind of gender and age users boarded at each station. In this case, the output table 2 is the table in which a date, a station name, a gender, and an age are associated with each other.

In the PBE, the user first inputs an example 5 into the computer. The example 5 is a combination of a part of the input table 1 and the output table 2 corresponding thereto.

Next, the computer generates a program 6 for transforming the part of the input table 1 in the example 5 to obtain the output table 2, as illustrated in FIG. 2. In this instance, the computer uses an auxiliary table 3 to generate the program 6. The auxiliary table 3 is a table that collects known information. For example, the auxiliary table 3 is a table in which the ID, the gender and the age of each user are associated with each other.

The computer replaces the ID in the input table 1 with the gender and the age in the auxiliary table 3 by combining the input table 1 and the auxiliary table 3. Further, the computer unifies a data format of the output table 2 to the date by removing the time from the date and time of the input table 1.

Thus, the computer is able to generate the program 6 that transforms the part of the input table 1 in the example 5 to obtain the output table 2. The program 6 is a program for obtaining the output table 2 by performing, on the input table 1, transformation combining a plurality of processings such as combining the tables and unifying the data formats as described above.

After that, the computer automatically transforms the input data other than the example 5 by using the program 6.

Figure 3:
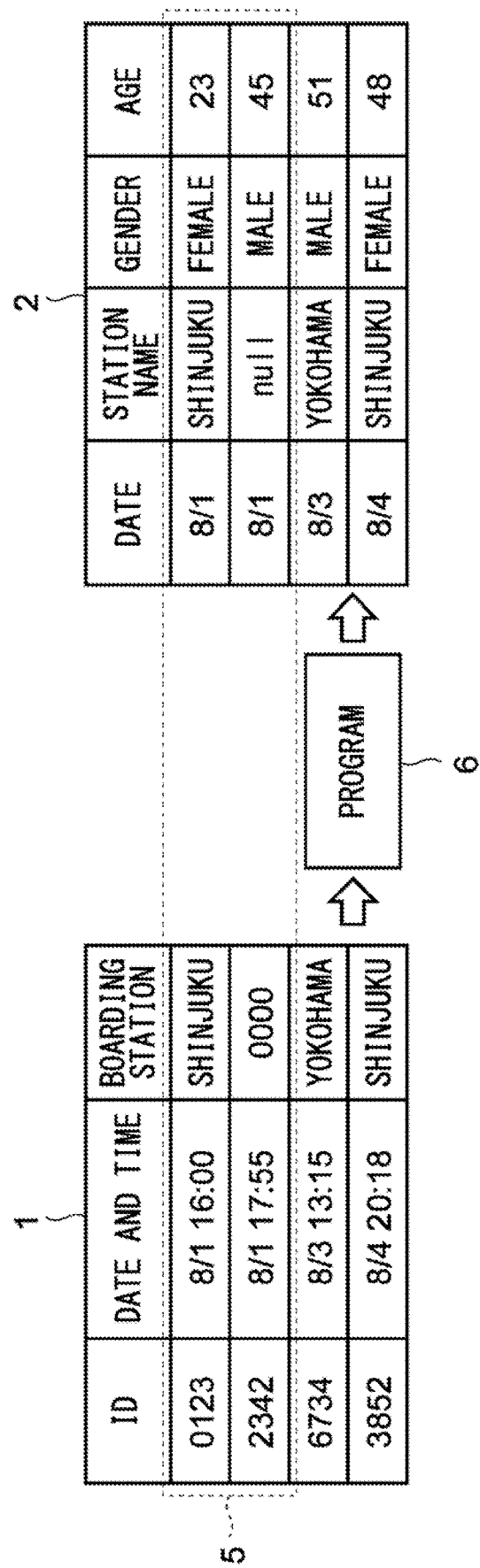
FIG. 3 is a schematic diagram illustrating an example of transformation of input data other than an example.

FIG. 3 is a schematic diagram illustrating an example of the transformation. In the example of FIG. 3, the program 6 transforms the input data of third and fourth rows in the input table 1 to output the output data of third and fourth rows in the output table 2, respectively.

According to the PBE described above, the computer can automatically generate the program 6 by inputting the example 5 to the computer by the user. Therefore, it is possible to reduce the burden on the user as compared with the case where the user manually generates the program 6.

By the way, the program 6 generated by the PBE outputs the correct output table 2 for the input table 1 of the example 5, but may output output data different from output data expected by the user for the input data in the input table 1 other than the example 5. Hereinafter, the output data expected by the user is referred to as a correct answer, and the output data different from the output data expected by the user is also referred to as an incorrect answer.

Figure 4:
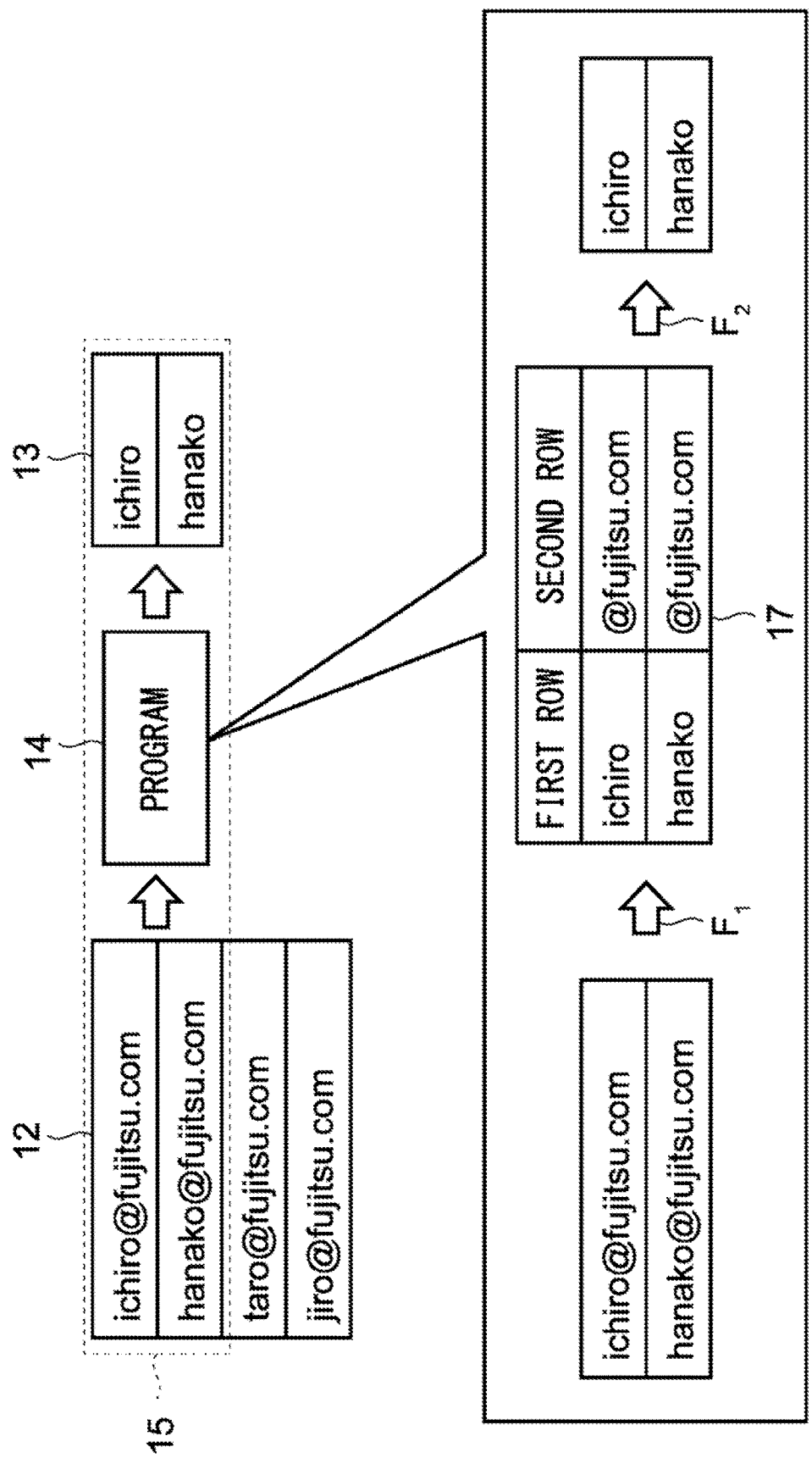
FIG. 4 is a schematic diagram in the case of outputting incorrect output data (part 1)
Figure 5:
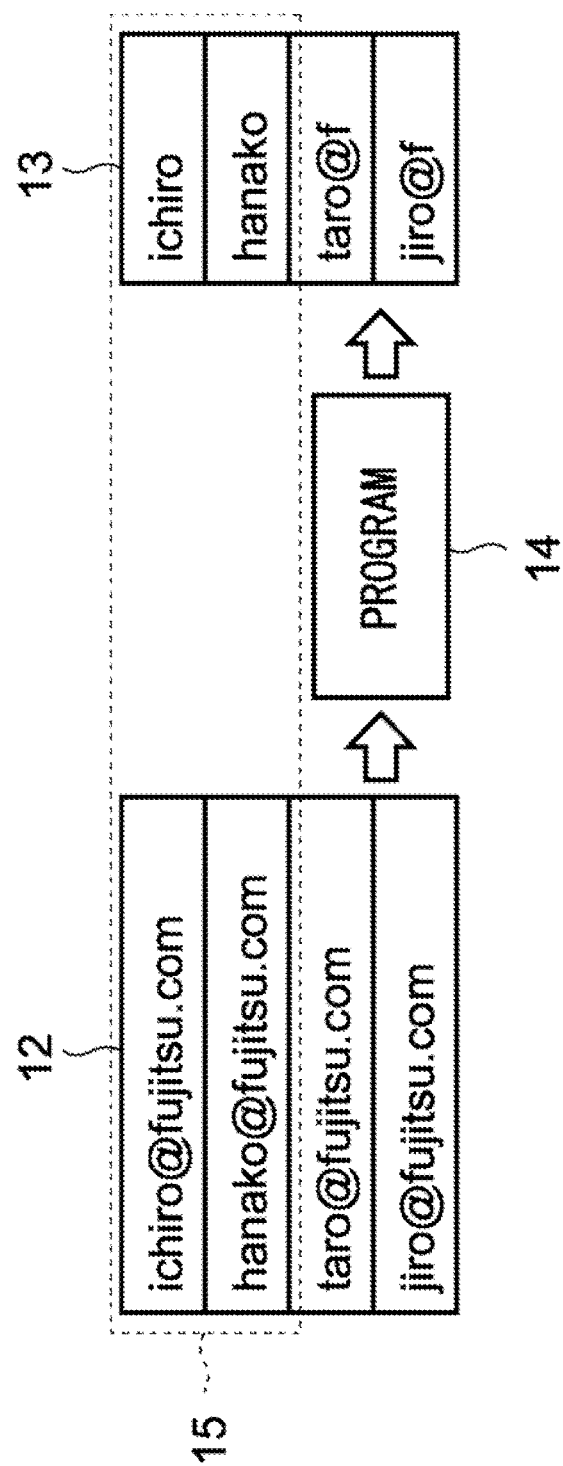
FIG. 5 is a schematic diagram in the case of outputting the incorrect output data (part 2)

FIGS. 4 and 5 are schematic diagrams in the case of outputting incorrect output data. In this example, a program 14 that transforms an input table 12 including a plurality of e-mail addresses into an output table 13 that extracts character strings prior to "@" from each e-mail address is considered as illustrated in FIG. 4.

In this case, the computer generates the program 14 using the PBE based on an example 15 including the output table 13 and a part of the input table 12 corresponding thereto.

The user expects to extract the character strings prior to "@" from each e-mail address, but suppose that the computer generates the program 14 that performs processing F1 and processing F2 in this order. The processing F1 is a process of generating a new table 17 in which first 6 characters of the e-mail address are stored in a first column, and 7th and subsequent characters are stored in a second column. The processing F2 is a process of deleting the second column of the table 17. As far as the example 15 is concerned, the correct output data can be obtained even with such a program 14.

However, the program 14 may output the incorrect output data for the input data other than the example 15 in the input table 12, as follows.

FIG. 5 is a schematic diagram illustrating an example of the output table 13 output by the program 14 for the input data other than the example 15.

In this example, the first 6 characters "taro@f" of "taro@fujitsu.com" are output, and "taro" expected by the user are not output, as illustrated in FIG. 5. Similarly, with respect to "jiro@fujitsu.com", the first 6 characters "jiro@f" are output instead of the "jiro" expected by the user.

Thus, the incorrect output data may be output, and it is therefore necessary to perform the following processing in the PBE.

Figure 6:
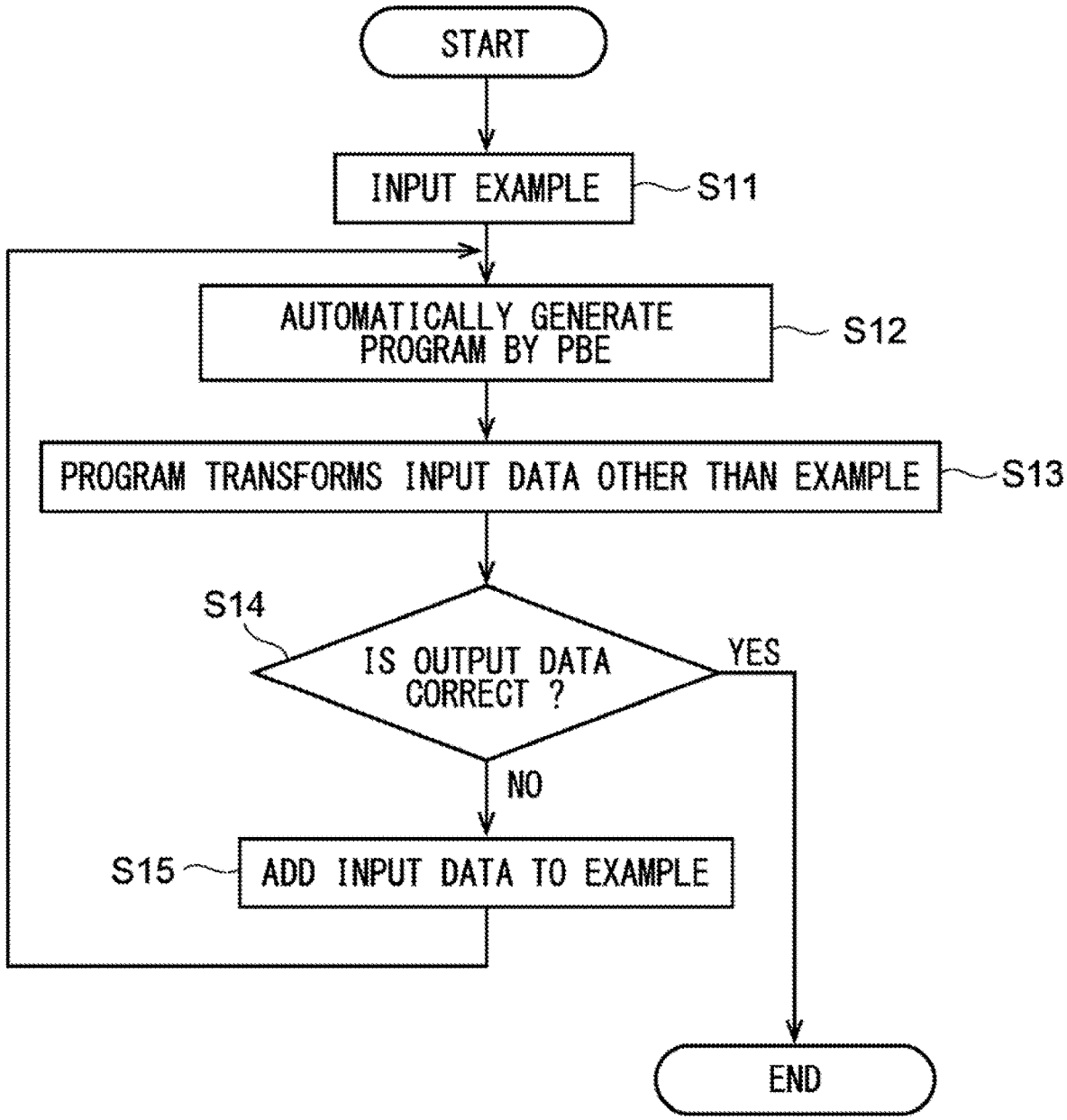
FIG. 6 is a flowchart of processing in the PBE.

FIG. 6 is a flowchart of processing in the PBE. First, the user inputs the example 15 to the computer (step S11), and the computer generates the program 14 by the PBE (step S12).

Next, the user inputs the input data other than the example 15 to the computer, and the computer executes the program 14 to output the output data transformed from the input data (step S13).

Next, the user checks whether the output data is correct (step S14). Here, when it is determined that the output data is correct, the processing ends.

On the other hand, when it is determined that the output data is incorrect, the processing proceeds to step S15. In step S15, the user adds the input data used in step S13 to the example 15. After that, the processing is restarted from step S12. This completes the basic steps of the processing in the PBE.

In this way, the input data in which the correct answer is not obtained is added to the example 15 (step S15) and the program 14 is automatically generated by the PBE again (step S12), so that a possibility that the program 14 outputs the correct output data increases.

However, if the user selects the input data to be added in step S15 at random, the loop processing of steps S12 to S15 needs to be executed many times until the correct output data is obtained.

Figure 7:
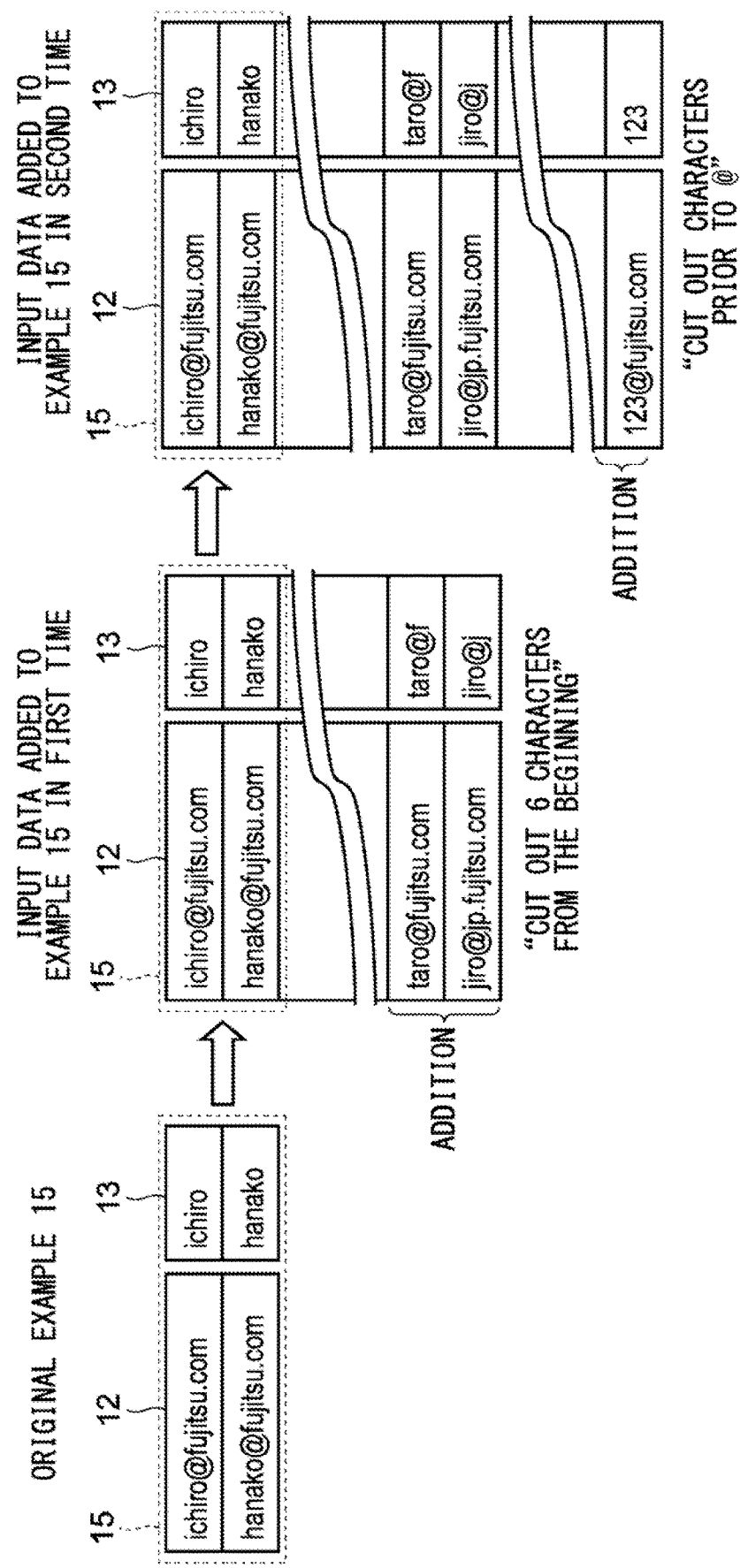
FIG. 7 is a diagram schematically illustrating input data added to the example in each loop processing.

FIG. 7 is a diagram schematically illustrating the input data added to the example 15 in each loop processing. In this example, the correct data is finally obtained by adding the input data to the example 15 twice.

If the loop processing is executed many times in this way, the number of times the user checks the output data in step S14 also increases, which increases the burden on the user.

Hereinafter, the present embodiment that can reduce the number of checks performed by the user is described.

Present Embodiment

Figure 8:
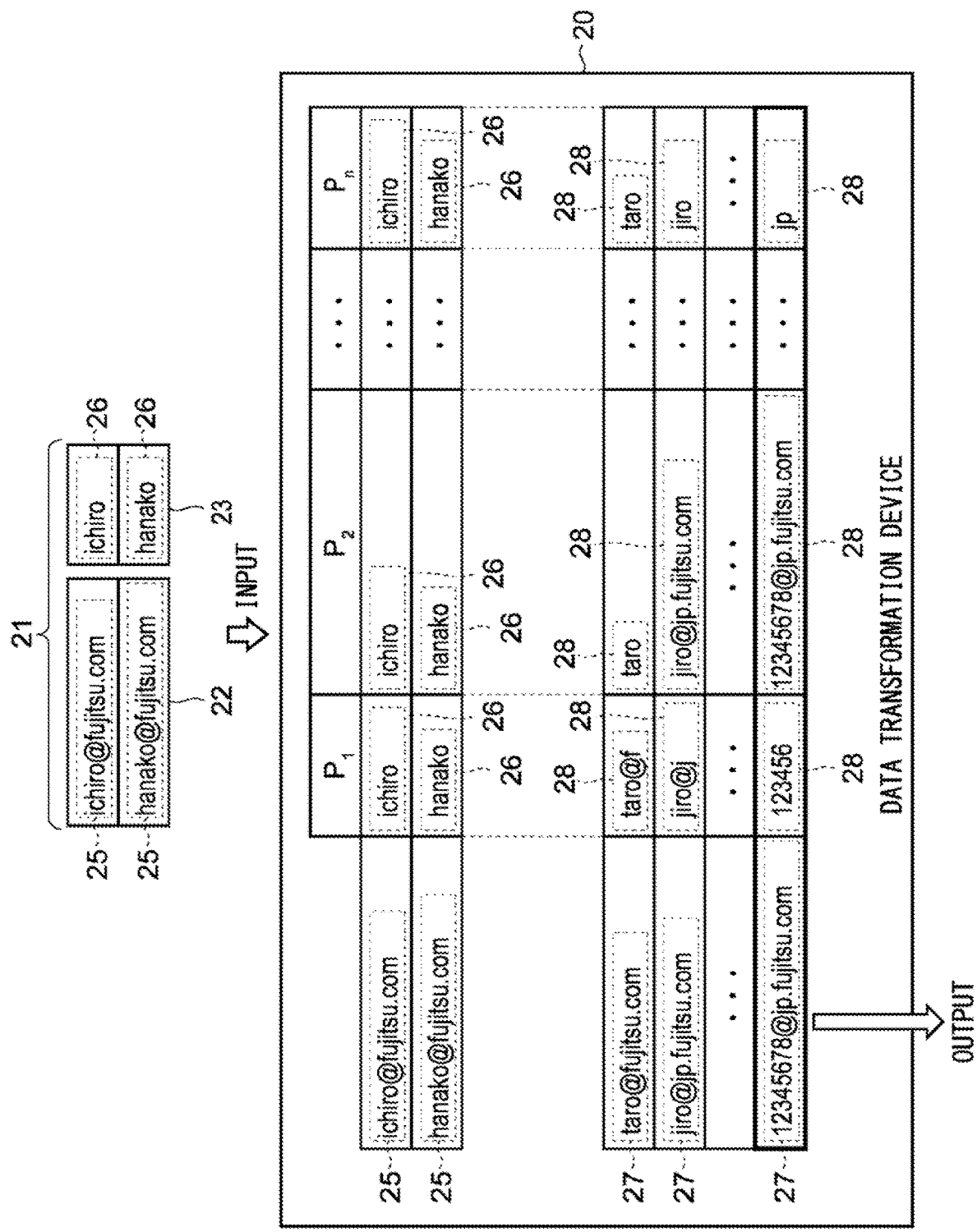
FIG. 8 is a schematic view illustrating processing performed by a data transformation device according to a present embodiment.

FIG. 8 is a schematic view illustrating processing performed by a data transformation device according to the present embodiment.

A data transformation device 20 is a computer such as a PC or a server, and outputs the input data that is preferred to be added as an example of the PBE. Here, a description is given of a case where the data transformation device 20 generates the program for outputting character strings prior to "@" from the e-mail address by using the PBE, as an example.

In this case, the user first inputs an example 21 to the data transformation device 20. The example 21 is data that includes an input table 22 and an output table 23 transformed from the input table 22. Hereinafter, data included in the input table 22 is referred to as first input data 25, and data included in the output table 23 is referred to as first output data 26.

In this example, the first input data 25 is "ichiro@fujitsu.com" and "hanako@fujitsu.com", and the first output data 26 is "ichiro" and "hanako".

The data transformation device 20 receives the input of the example 21, and generates a plurality of programs $P_1$ to $P_n$ that transform the first input data 25 to output the first output data 26. All of these programs $P_1$ to $P_n$ are programs that output the same first output data 26 from the same first input data 25. For example, each of the programs $P_1$ to $P_n$ outputs the same character strings "ichiro" from the same e-mail address "ichiro@fujitsu.com".

However, the programs $P_1$ to $P_n$ output the same first output data 26 in this way, but the contents of transforming the first input data 25 are different from each other. As an example, the program $P_1$ is a program that outputs the first 6 characters of the first input data 25, whereas the program $P_2$ is a program that deletes the character strings "@fujitsu.com" in the first input data 25. Further, the program $P_n$ is a program that extracts first character strings excluding numbers and symbols from the first input data 25.

In general, when the transformation from one table to another table is represented by processing $f_k$ (k=1, 2, . . . . N), each of the programs $P_1$ to $P_n$ can be represented by the product of a plurality of processings $f_k$. For example, each program can be expressed as $P_1=f_3 \cdot f_5 \cdot \ldots \cdot f_{10}$, $P_2=f_2 \cdot f_4 \cdot \ldots \cdot f_7$, $P_3=f_3 \cdot f_6 \cdot \ldots \cdot f_7$, or the like. In this case, the processing columns "$f_3 \cdot f_5 \cdot \ldots \cdot f_{10}$", "$f_2 \cdot f_4 \cdot \ldots f_7$" and "$f_3 \cdot f_6 \cdot \ldots \cdot f_7$" are different from each other in the programs $P_1$ to $P_n$. Hereinafter, the processing $f_k$ (k=1, 2 . . . . N) is also referred to as an operator $f_k$ (k=1, 2, . . . . N).

Next, the data transformation device 20 receives inputs of a plurality of pieces of second input data 27 different from the example 21. As an example, the second input data 27 is "taro@fujitsu.com", "jiro@jp.fujitsu.com", and "12345678@jp.fujitsu.com".

Then, the data transformation device 20 acquires second output data 28 output by each of the programs $P_1$ to $P_n$ when each of the plurality of pieces of second input data 27 is input to each of the programs $P_1$ to $P_n$.

Then, the data transformation device 20 identifies the second input data 27 such that each of the plurality of pieces of second output data 28 is not biased to specific data and has a highest ambiguity. In this example, when the second input data 27 is "taro@fujitsu.com", both of the second output data 28 of the program $P_2$ and the program Pa are "taro", and are biased towards the specific data "taro".

On the other hand, when the second input data 27 is "12345678@jp.fujitsu.com", the second output data 28 of all the programs $P_1$ to $P_n$ are different from each other, and the plurality of pieces of second output data 28 have the highest ambiguity.

In this way, when the PBE is executed by adding the second input data 27 and the second output data 28, which have the highest ambiguity, to the example 21, a possibility that a program outputting the correct output data for the input data different from the example 21 is generated is increased. For example, on the contrary, even if the PBE is executed by adding the second input data 27 in which the outputs of all the programs $P_1$ to $P_n$ are the same, to the example 21, the outputs of the programs $P_1$ to $P_n$ are all the same, and hence the program that outputs the correct answer cannot be extracted by the example 21. The program generated by the PBE is not necessarily the same as the programs $P_1$ to $P_n$, but for the same reason as above, the example 21 is not useful for extracting the program that outputs the correct answer.

Since the second input data 27 which has the highest ambiguity is opposite of the above, adding the second input data 27 to the example 21 increases the possibility that the PBE can generate the program that output the correct data even for input data that is not included in the example 21.

Therefore, in the present embodiment, the data transformation device 20 outputs the second input data 27 having the highest ambiguity in this way. When the user adds the second input data 27 to the example 21 and the data transformation device 20 executes the PBE, the possibility that the program that output the correct data even for input data that is not included in the example 21 is obtained is increased as described above.

The ambiguity can be defined using an entropy H of a formula (1).

(Formula 1)

$$H(P) = -\sum_{A \in \Omega} P(A) \log P(A) \qquad (1)$$

In the formula (1), a code "A" is an event including each of the second output data 28. A code "Ω" is a probability space in which the second output data 28 is an element. A code "P(A)" is an appearance probability of the event "A" on the probability space "Ω".

FIGS. 9A and 9B are schematic views illustrating the entropy. Here, it is assumed that the data transformation device 20 generates five programs $P_1$ to $P_5$.

FIG. 9A illustrates a case where the second input data 27 is "ichiro@fujitsu.com" and all programs $P_1$ to $P_5$ output same "ichiro" for the second input data 27, as the second output data 28. When the second output data 28 is biased toward the single data "ichiro" in this way, the entropy H (P) becomes 0.

In contrast, FIG. 9B illustrates a case where the second input data 27 is "12345678@jp.fujitsu.com". It is assumed that, for the second input data 27, the second output data 28 output by the programs $P_2$ and $P_3$ are same data "12345678·jp.fujitsu.com" and the second output data 28 output by the programs $P_4$ and P5 are same data "jp".

The entropy H (P) in this case is about 1.05492, which is larger than that in the case of FIG. 9A.

In the present embodiment, the larger the entropy of the plurality of pieces of second output data 28, the higher the ambiguity of the plurality of pieces of second output data 28. In the examples of FIGS. 9A and 9B, the data transformation device 20 outputs "12345678@jp.fujitsu.com" as the second input data 27 which maximizes the entropy of the plurality of pieces of second output data 28.

Next, a method of generating the above-mentioned plurality of programs $P_1$ to $P_n$ by the data transformation device 20 is described.

In the present embodiment, the data transformation device 20 generates the plurality of programs $P_1$ to $P_n$ by using graph search as follows.

Figure 10:
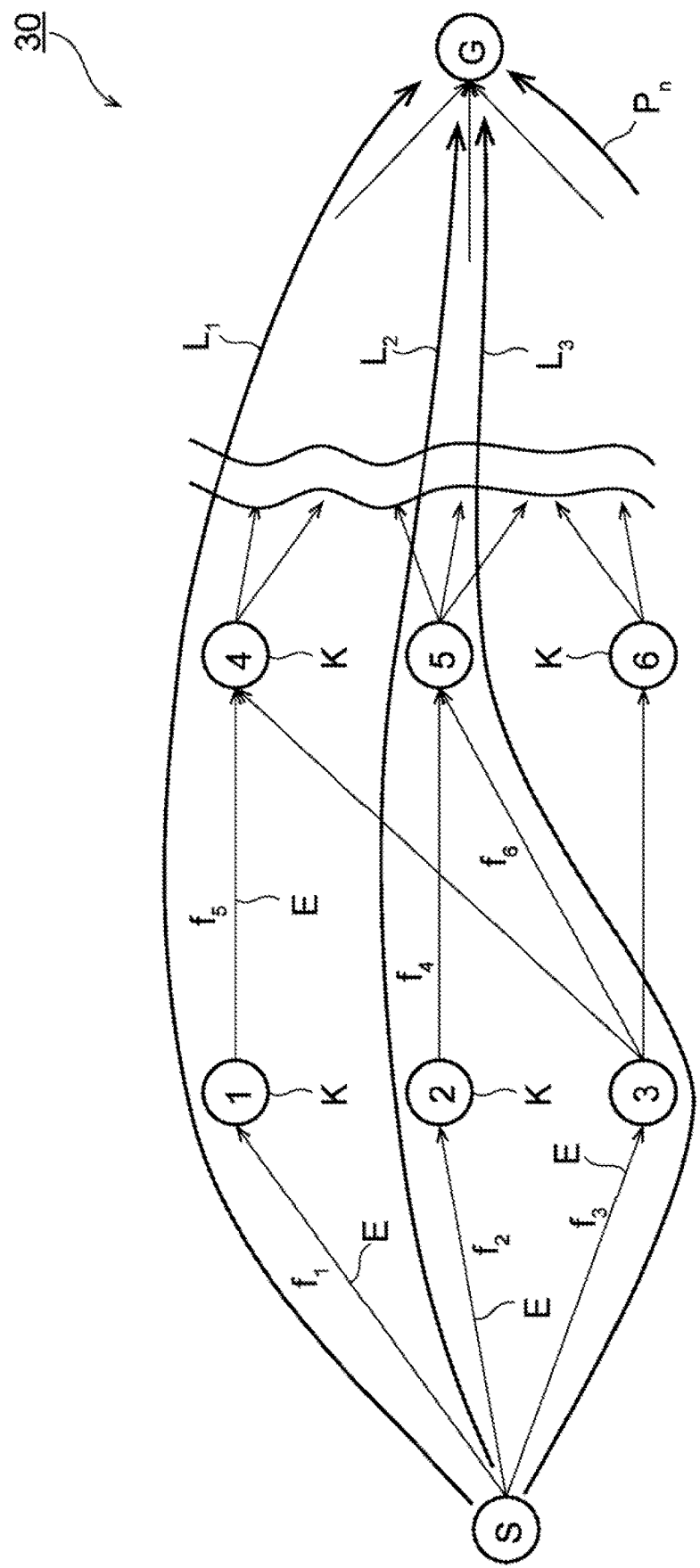
FIG. 10 is a schematic diagram illustrating a graph used in graph search.

FIG. 10 is a schematic diagram illustrating a graph used in the graph search.

As illustrated in FIG. 10, a graph 30 has a start node S, a goal node G, intermediate nodes K, and edges E.

The start node S indicates the input table 22 in the example 21, and the goal node G indicates the output table 23 in the example 21.

Further, each of the edges E indicates each processing when each of the plurality of programs $P_1$ to $P_n$ is represented by the product of the plurality of operators $f_k$ (k=1, 2, . . . . N). Each of the intermediate nodes K indicates a table when any one of the plurality of operators $f_k$ is performed on the input table 22. Here, each of the plurality of intermediate nodes K is identified by natural numbers 1, 2, . . . . In this case, the intermediate node K of "1" corresponds to the table obtained by performing the operator $f_t$ on the input table 22 corresponding to the start node S. Further, the intermediate node K of "4" corresponds to the table obtained by performing the operator $f_t$ and the operator $f_5$ on the input table 22 in this order.

In the present embodiment, the data transformation device 20 specifies a plurality of routes $L_1$ to $L_n$ that can reach the goal node G from the start node S. Then, the data transformation device 20 generates the programs corresponding to the respective routes $L_1$ to $L_n$ as the above-mentioned $P_1$ to $P_n$.

Thereby, the data transformation device 20 can easily generate the plurality of programs $P_1$ to $P_n$ which transform the input table 22 corresponding to the start node S into the output table 23 corresponding to the goal node G.

In the present embodiment, an A* algorithm is used as an algorithm for specifying the routes $L_1$ to $L_n$.

Figure 11:
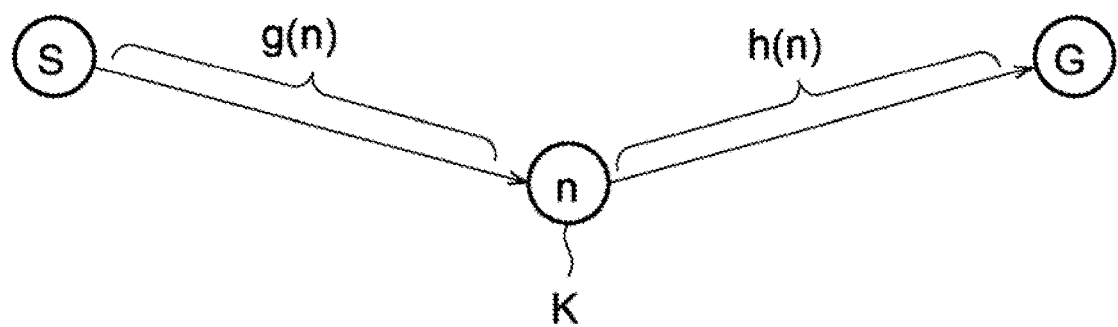
FIG. 11 is a schematic diagram illustrating a distance function g(n) and a heuristic function h(n) which are used in an A* algorithm.

FIG. 11 is a schematic diagram illustrating a distance function g(n) and a heuristic function h(n) which are used in the A* algorithm.

The distance function g(n) is the number of edges in the shortest route having the smallest number of edges E among the routes from the start node S to the n-th intermediate node K. The heuristic function h(n) is a function representing an estimated distance from the n-th intermediate node K to the goal node G. For example, a function disclosed in the above-mentioned Non-Patent Document 1 can be used as the heuristic function h(n).

In the present embodiment, an evaluation function f(n) of a formula (2) defined by the distance function g(n) and the heuristic function h(n) is used in the A* algorithm.

(Formula 2)

$$f(n)=g(n)+\alpha h(n) \quad (2)$$

Here, a coefficient α in the formula (2) is a number of 0 or more for absorbing a difference in the respective units of the distance function g(n) and the heuristic function h(n). This evaluation function f(n) is a function that evaluates an approximate distance of the route from the start node S to the goal node G via the n-th intermediate node K.

In the A* algorithm, the search is executed by selecting the intermediate node K having the smallest value of the evaluation function f(n) from the intermediate nodes K that are candidates for the search. When a value close to 0 is adopted as the coefficient α, breadth-first search is executed, and when the coefficient α is increased, depth-first search is executed.

Next, the outline of the A* algorithm is described. FIG. 12 is a schematic diagram illustrating the A* algorithm. Hereinafter, a set of the intermediate nodes K during the search is referred to as an OPEN list, and a set of the intermediate nodes K after the search is referred to as a CLOSE list. The A* algorithm is executed using the OPEN list and the CLOSE list as follows.

(Step S1)
The start node S is added to the OPEN list.
(Step S2)
If the OPEN list is an empty set φ, it is determined that the search fails.
If the OPEN list is not the empty set φ, the n-th intermediate node K having the smallest evaluation function f(n) is specified among the plurality of intermediate nodes K.
(Step S3)
If the specified intermediate node K is equal to the goal node G, the search ends.
On the other hand, if the specified intermediate node K is not equal to the goal node G, the intermediate node K is added to the CLOSE list.
(Step S4)
The following steps P1 to P2 are executed to all the m-th intermediate nodes K adjacent to the n-th intermediate node K.
(Step P1)
A formula "f(m)=g(n)+cost (n,m)+h(m)" is calculated. Wherein cost (n,m) is a moving cost from the n-th intermediate node K to the m-th intermediate node K.
(Step P2)
The following steps Q1 to Q3 are executed to all the "m".
(Step Q1)
If the m-th intermediate node K is not included in either the OPEN list or the CLOSE list, f(m) is substituted in f(m). Then, the m-th intermediate node K is added to the OPEN list, and the n-th intermediate node K is recorded as a parent node of the intermediate node K.
(Step Q2)
If the m-th intermediate node K is included in the OPEN list and f(m)<f(m) is satisfied, f(m) is substituted in f(m). Then, the parent node of the m-th intermediate node K is replaced with the n-th intermediate node K.
(Step Q3)
If the m-th intermediate node K is included in the CLOSE list and f(m)<f(m) is satisfied, f(m) is substituted in f(m). Then, the m-th intermediate node K is added to the OPEN list. Further, the parent node of the m-th intermediate node K is replaced with the n-th intermediate node K.
(Step S5)
Step S2 and subsequent steps are repeated.
This completes the basic processing of the A* algorithm.

When the A* algorithm is executed, only one of the routes $L_1$ to $L_n$ can be found by the search. Therefore, in the present embodiment, the data transformation device 20 sets a plurality of patterns to the moving cost "cost (n,m)" in the graph 30, and finds the plurality of routes $L_1$ to $L_n$ by searching for the route for each of the patterns.

Figure 13:
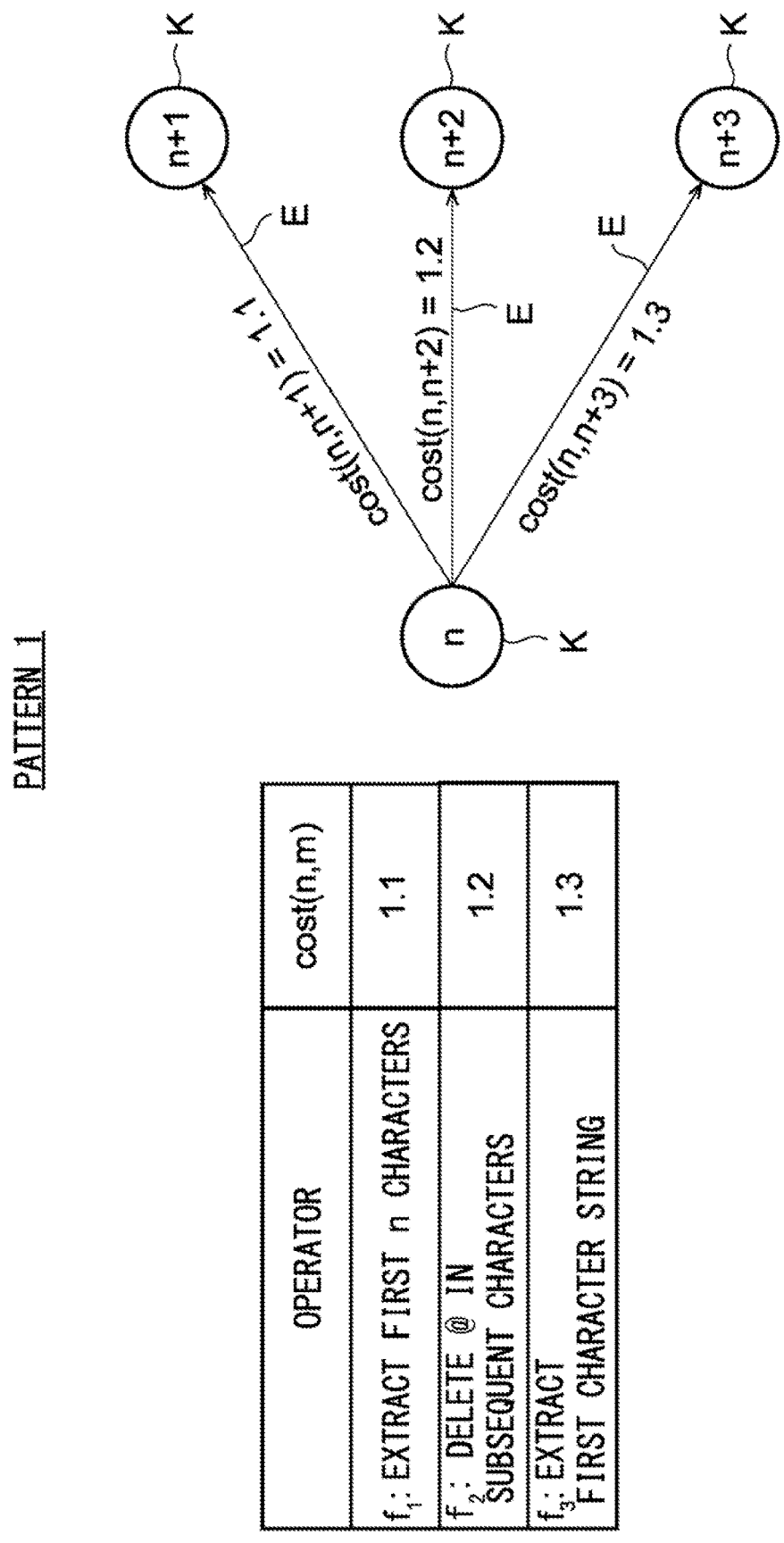
FIG. 13 is a schematic diagram illustrating an example of a pattern of moving costs (part 1)
Figure 14:
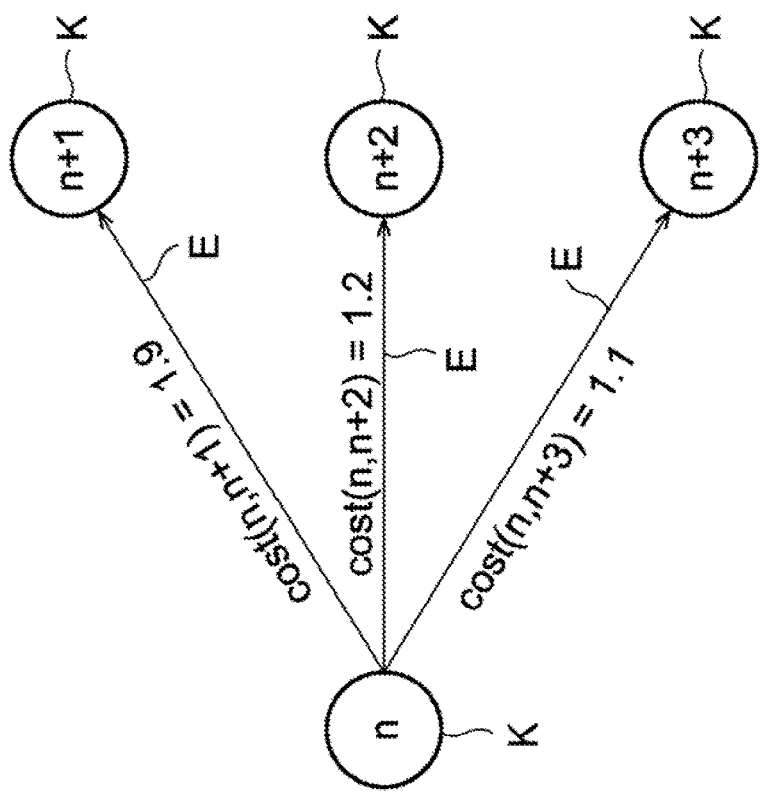
FIG. 14 is a schematic diagram illustrating an example of a pattern of moving costs (part 2)
Figure 15:
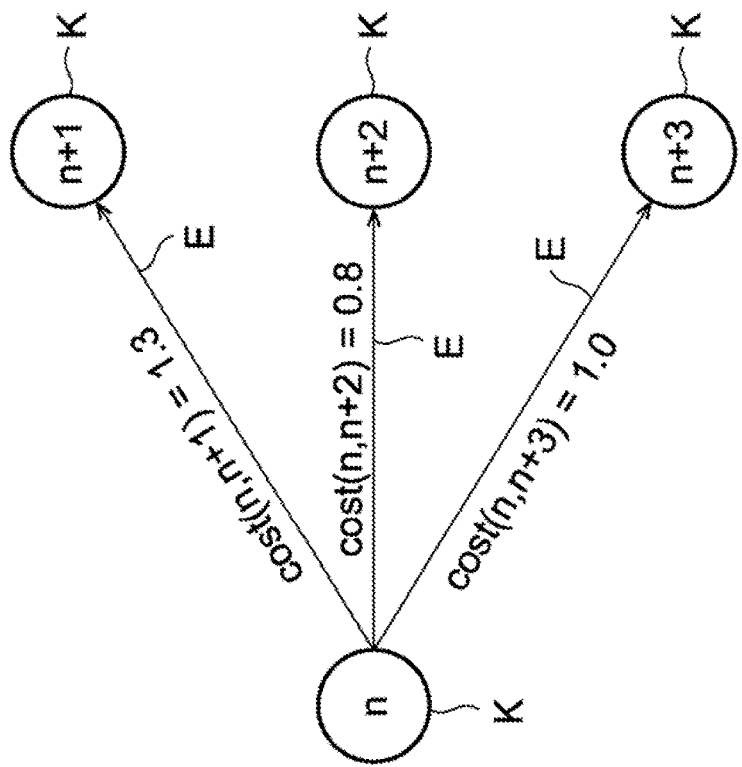
FIG. 15 is a schematic diagram illustrating an example of a pattern of moving costs (part 3)

FIGS. 13 to 15 are schematic diagrams illustrating examples of the patterns of the moving cost "cost (n,m)".

FIG. 13 is a schematic diagram of a pattern 1. In the pattern 1, the moving cost of the operator f1 extracting the first n characters is 1.1, the moving cost of the operator f2 deleting @ and the subsequent characters is 1.2, and the moving cost of the operator f3 extracting the first character string is 1.3.

FIGS. 14 and 15 are schematic diagrams of patterns 2 and 3, respectively. The patterns 1 to 3 are determined by the data transformation device 20 so that the moving costs of at least one operator are different from each other.

Figure 16A:
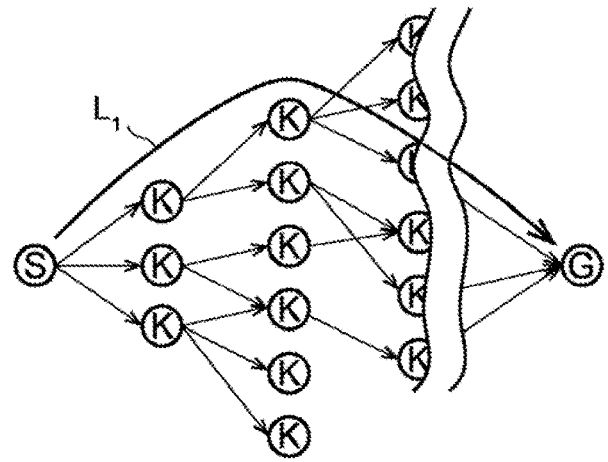
FIGS. 16A to 16C are diagrams schematically illustrating routes found in patterns 1 to 3, respectively.
Figure 16B:
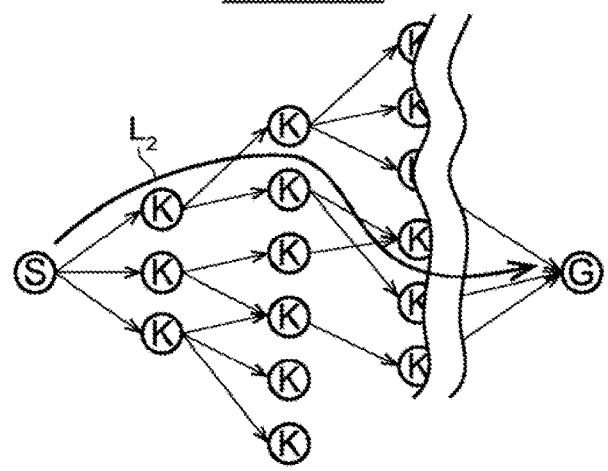
Figure 16C:
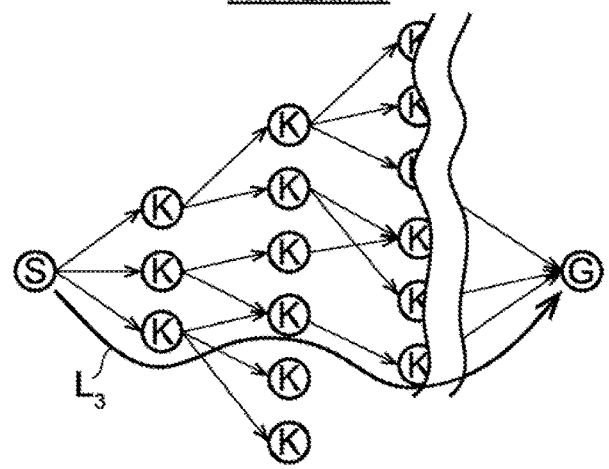

FIGS. 16A to 16C are diagrams schematically illustrating the routes L to L found in the patterns 1 to 3, respectively.

Since the moving cost of each of the patterns 1 to 3 is changed as illustrated in FIGS. 16A to 16C, the routes L to L found by the search are different from each other in the patterns 1 to 3.

Instead of generating the plurality of patterns having different moving costs in this way, a plurality of patterns having mutually different values of the coefficients α in the formula (2) may be generated. Thereby, the plurality of routes $L_1$ to $L_n$ corresponding to the respective patterns can be obtained.

When the A* algorithm is used in this way, the plurality of routes $L_1$ to $L_n$ from the same start node S to the same goal node G can be easily obtained by merely changing parameters such as the moving cost and the coefficient α used inside the algorithm.

Figure 17:
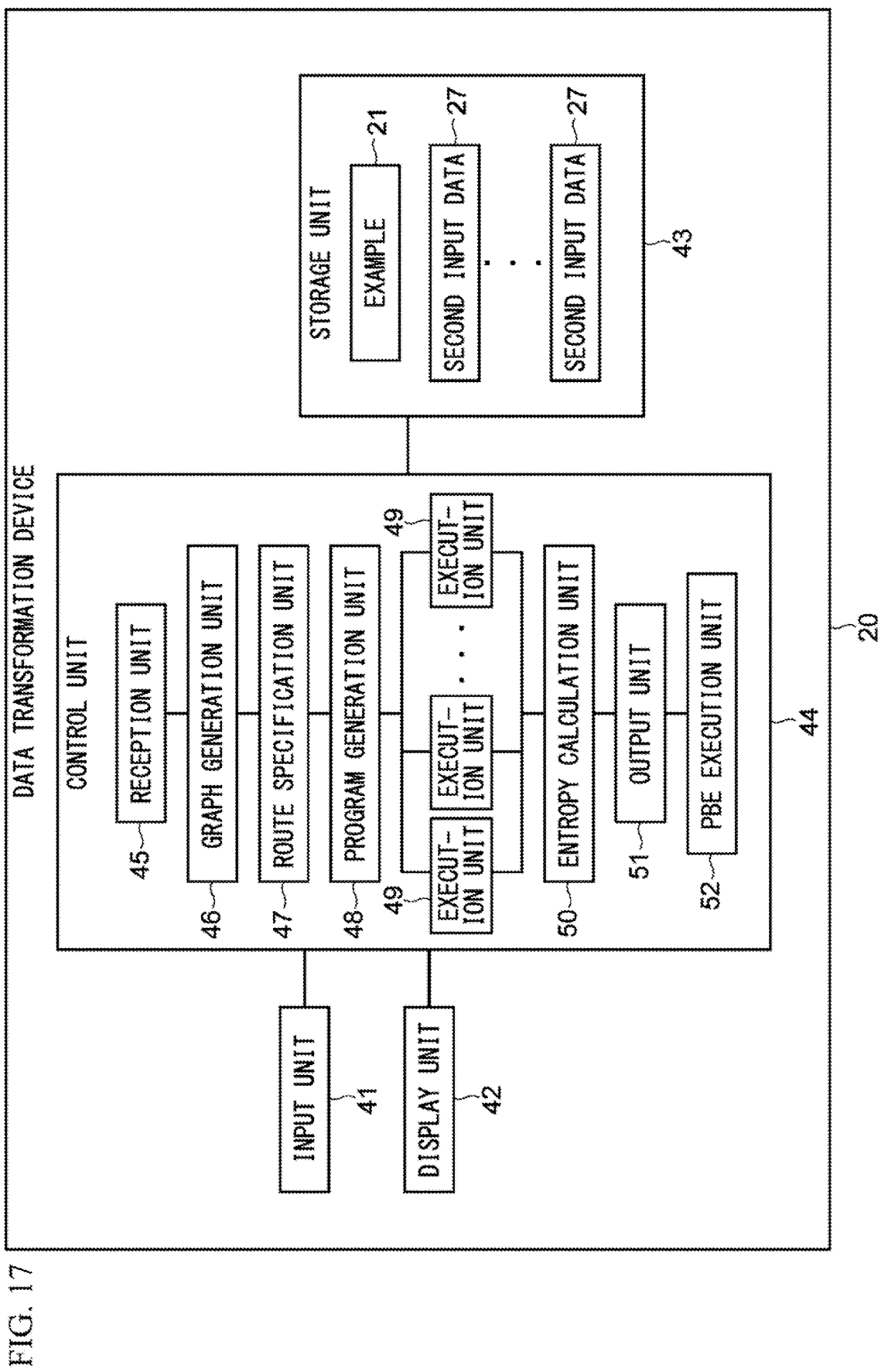
FIG. 17 is a functional configuration diagram of the data transformation device according to the present embodiment.

Next, a description is given of the functional configuration of the data transformation device 20 according to the present embodiment. FIG. 17 is a functional configuration diagram of the data transformation device 20 according to the present embodiment.

As illustrated in FIG. 17, the data transformation device 20 includes an input unit 41, a display unit 42, a storage unit 43 and a control unit 44.

The input unit 41 is an input device such as a keyboard or a mouse operated by the user. By operating the input unit 41, the user inputs the example 21 (see FIG. 8) and the plurality of pieces of second input data 27 (see FIG. 8) to the data transformation device 20.

The display unit 42 is a display device such as a liquid crystal display. As an example, the display unit 42 displays the second input data that maximizes the entropy of the plurality of pieces of the second output data 28 (see FIG. 8) among the plurality of pieces of second input data 27.

The storage unit 43 stores the example 21 and the plurality of pieces of second input data 27 which are input by the user in the data transformation device 20.

The control unit 44 is a processing unit that controls each unit of the data transformation device 20. In this example, the control unit 44 includes a reception unit 45, a graph generation unit 46, a route specification unit 47, a program generation unit 48, an execution unit 49, an entropy calculation unit 50, an output unit 51 and a PBE execution unit 52.

The reception unit 45 is a processing unit that receives the input of the example 21 and the plurality of pieces of second input data 27 and stores them in the storage unit 43.

The graph generation unit 46 is a processing unit that generates the graph 30 illustrated in FIG. 10 based on the example 21 stored in the storage unit 43. As illustrated in FIG. 10, the graph 30 is a graph in which the input table 22 included in the example 21 is the start node S and the output table 23 included in the example 21 is the goal node G Each of the edges E in the graph 30 represents each of the plurality of operators fk (k=1, 2, . . . . N), and the intermediate node K represents the table when any one of the plurality of operators fk is performed on the input table 22.

The route specification unit 47 is a processing unit that specifies the plurality of routes L to L that can reach the goal node G from the start node S in the graph 30. As an example, the route specification unit 47 specifies n routes $L_1$ to $L_n$ by searching for routes for each of n patterns having different moving costs in the graph 30 using the A* algorithm, as illustrated in FIGS. 16A to 16C.

The program generation unit 48 is a processing unit that generates the programs $P_1$ to $P_n$ corresponding to the specified route $L_1$ to $L_n$, respectively.

The execution unit 49 is a processing unit that executes the programs $P_1$ to $P_n$. The programs $P_1$ to $P_n$ during the execution output the plurality of pieces of second output data 28 corresponding to the plurality of pieces of second input data 27, respectively.

In this example, the data transformation device 20 includes a plurality of execution units 49 corresponding to the programs $P_1$ to $P_n$, respectively, and the respective execution units 49 execute the programs $P_1$ to $P_n$ in parallel. Thereby, the data transformation device 20 can output the plurality of pieces of second output data 28 at high speed. When it is not necessary to output the plurality of pieces of second output data 28 at high speed, only a single execution unit 49 may be provided in the data transformation device 20, and the single execution unit 49 may execute each of the programs $P_1$ to $P_n$.

The entropy calculation unit 50 is a processing unit that calculates the entropy of the plurality of pieces of the second output data 28 for each of the plurality of pieces of second input data 27. For example, the entropy calculation unit 50 calculates the entropy of the second output data 28 for each of the plurality of pieces of second input data 27 based on the formula (1).

The output unit 51 is a processing unit that outputs the second input data 27 that maximizes the entropy of the plurality of pieces of the second output data 28 among the plurality of pieces of second input data 27. The output second input data 27 is displayed on the display unit 42, which allows the user to understand the second input data 27 that is preferable to be added to the example 21.

The PBE execution unit 52 is a processing unit that adds the output second input data 27 and the correct output data corresponding to the output second input data 27 to the example 21 and generates the program by the PBE.

Figure 18:
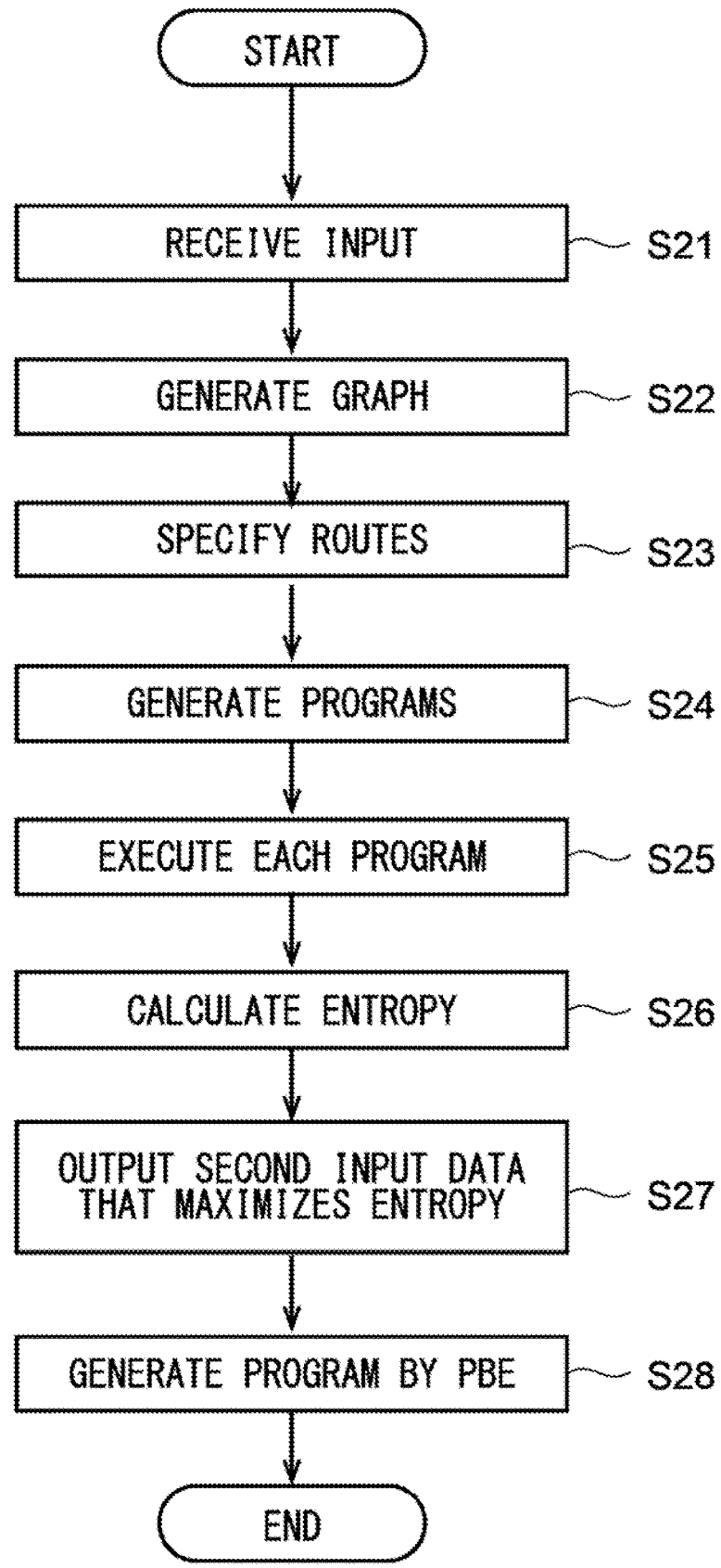
FIG. 18 is a flowchart of a data transformation method according to the present embodiment.

Next, a description is given of a data transformation method according to the present embodiment. FIG. 18 is a flowchart of the data transformation method according to the present embodiment.

First, the reception unit 45 receives the input of the example 21 and the plurality of pieces of second input data 27 and stores them in the storage unit 43 (step S21).

Next, the graph generation unit 46 generates the graph 30 of FIG. 10 based on the example 21 received by the reception unit 45 (step S22).

Next, the route specification unit 47 specifies the plurality of routes $L_1$ to $L_n$ that can reach the goal node G from the start node S in the graph 30 (step S23).

Subsequently, the program generation unit 48 generates the programs $P_1$ to $P_n$ corresponding to the respective routes $L_1$ to $L_n$ specified by the route specification unit 47 (step S24).

Next, the execution units 49 execute the programs $P_1$ to $P_n$ (step S25). Thereby, the programs $P_1$ to $P_n$ during the execution output the plurality of pieces of second output data 28 corresponding to the plurality of pieces of second input data 27, respectively.

Then, the entropy calculation unit 50 calculates the entropy of the plurality of pieces of second output data 28 for each of the plurality of pieces of second input data 27 based on the formula (1) (step S26).

After that, the output unit 51 outputs the second input data 27 that maximizes the entropy of the plurality of pieces of the second output data 28 among the plurality of pieces of second input data 27 (step S27).

Next, the PBE execution unit 52 adds the output second input data 27 and the correct output data corresponding to the output second input data 27 to the example 21, and generates the program by the PBE (step S28). Step S28 may be executed by a computer different from the data transformation device 20.

This completes the basic processing of the data transformation method according to the present embodiment.

According to the present embodiment described above, the output unit 51 outputs the second input data 27 that maximizes the entropy of the plurality of pieces of the second output data 28 output by the plurality of programs $P_1$ to $P_n$, among the plurality of pieces of second input data 27.

Even if the second input data 27 is added to the example 21 so that each of the plurality of pieces of second output data 28 is biased to the specific data, the output of the programs $P_1$ to $P_n$ does not change before and after the addition. Therefore, the second input data 27 which outputs the plurality of pieces of second output data 28 having small entropy and less ambiguity is not useful for the PBE to generate a program for outputting correct data.

In the present embodiment, the output unit 51 outputs the second input data 27 maximizing the entropy opposite to the above. Therefore, the user adds the second input data 27 maximizing the entropy to the example 21, so that a possibility that the program generated by the PBE execution unit 52 using the PBE outputs the correct data increases. As a result, the number of times the loop process for adding new input data to the example 21 and executing the PBE again can be reduced, thereby reducing the number of times the user checks whether the PBE execution unit 52 output the correct data, and reducing the burden on the user. Moreover, since it is not necessary for the PBE execution unit 52 to execute the PBE many times until the program outputting the correct data is obtained, it is possible to suppress the consumption of the computational resource that is the data transformation device 20.

(Hardware Configuration)

Figure 19:
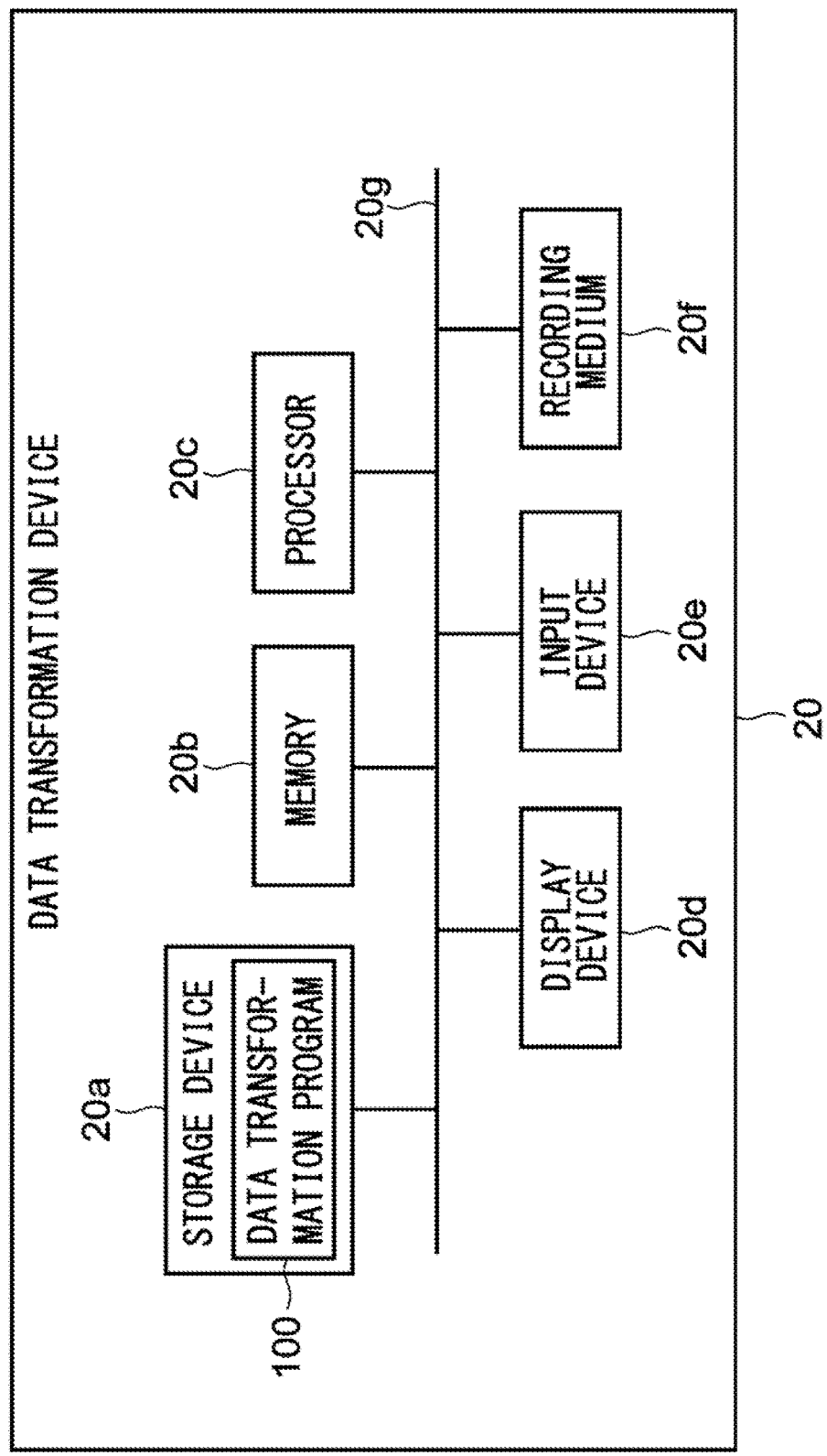
FIG. 19 is a hardware configuration diagram of the data transformation device according to the present embodiment.

FIG. 19 is a hardware configuration diagram of the data transformation device 20 according to the present embodiment.

As illustrated in FIG. 19, the data transformation device 20 includes a storage device 20a, a memory 20b, a processor 20c, a display device 20d, and an input device 20e. These elements are connected to each other via a bus 20g.

The storage device 20a is a non-volatile storage such as an HDD (Hard Disk Drive) or an SSD (Solid State Drive), and stores a data transformation program 100 according to the present embodiment.

The data transformation program 100 may be recorded on a computer-readable recording medium 20f, and the processor 20c may read the data transformation program 100 from the recording medium 20f.

Examples of such a recording medium 20f include physically portable recording media such as a CD-ROM (Compact Disc-Read Only Memory), a DVD (Digital Versatile Disc), and a USB (Universal Serial Bus) memory. Further, a semiconductor memory such as a flash memory, or a hard disk drive may be used as the recording medium 20f. The recording medium 20f is not a temporary medium such as a carrier wave having no physical form.

Further, the data transformation program 100 may be stored in a device connected to a public line, an Internet, a LAN (Local Area Network), or the like. In this case, the processor 20c may read and execute the data transformation program 100.

Meanwhile, the memory 20b is hardware that temporarily stores data, such as a DRAM (Dynamic Random Access Memory), and the data transformation program 100 is deployed on the memory 20b.

The processor 20c is hardware such as a CPU (Central Processing Unit) and a GPU (Graphical Processing Unit) that control each element of the data transformation device 20. Further, the processor 20c executes the data transformation program 100 in cooperation with the memory 20b.

In this way, the control unit 44 of FIG. 17 is realized by executing the data transformation program 100 in cooperation with the memory 20b and the processor 20c. The control unit 44 includes the reception unit 45, the graph generation unit 46, the route specification unit 47, the program generation unit 48, the execution unit 49, the entropy calculation unit 50, the output unit 51 and the PBE execution unit 52.

Further, the storage unit 43 of FIG. 17 is realized by the storage device 20a and the memory 20b.

The display device 20d is hardware such as a liquid crystal display device for realizing the display unit 42 of FIG. 17.

The input device 20e is hardware such as a keyboard and a mouse for realizing the input unit 41 of FIG. 17. For example, the user inputs the example 21 and the plurality of pieces of second input data 27 to the data transformation device 20 by operating the input device 20e.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A non-transitory computer-readable recording medium storing a data transformation program that causes a processor to execute a process, the process comprising:

generating a plurality of first programs, each of the first programs transforming first input data to first output data and outputting the first output data, contents of the transforming by the plurality of the first programs being different from each other, each of the first programs transforming a plurality of pieces of a second input data different from the first input data to a plurality of pieces of second output data and outputting the plurality of pieces of the second output data, each of the first programs performing the transforming by performing a plurality of processings on the first input data;

among the plurality of pieces of the second input data, outputting the second input data that maximizes an entropy of the plurality of pieces of the second output data;

generating a graph in which the first input data is a start node, the first output data is a goal node, each of the processings is an edge, and the first input data subjected to the processings is an intermediate node;

specifying a plurality of routes capable of reaching the goal node from the start node; and generating a second program corresponding to each of the plurality of specified routes as each of the first programs.

2. The non-transitory computer-readable recording medium as claimed in claim 1, the process further comprising specifying the plurality of routes using an A* search algorithm by changing a parameter used in the A* search algorithm.

3. The non-transitory computer-readable recording medium as claimed in claim 2, wherein the parameter is a moving cost of the edge.

4. The non-transitory computer-readable recording medium as claimed in claim 2, wherein the parameter is a weight of a heuristic function at the intermediate node.

5. A data transformation device comprising:
a memory; and
a processor coupled to the memory and configured to:
generate a plurality of first programs, each of the programs transforming first input data to first output data and output the first output data, contents of the transforming by the plurality of the programs being different from each other, each of the first programs transforming a plurality of pieces of a second input data different from the first input data to a plurality of pieces of second output data and outputting the plurality of pieces of the second output data, each of the first programs performing the transforming by performing a plurality of processings on the first input data;
among the plurality of pieces of the second input data output the second input data that maximizes an entropy of the plurality of pieces of the second output data;
generate a graph in which the first input data is a start node, the first output data is a goal node, each of the processings is an edge, and the first input data subjected to the processings is an intermediate node;
specify a plurality of routes capable of reaching the goal node from the start node; and
generate a second program corresponding to each of the plurality of specified routes as each of the first programs.

6. A data transformation method executed by a processor to execute a process, the process comprising:
generating a plurality of first programs, each of the programs transforming first input data to first output data and outputting the first output data, contents of the transforming by the plurality of the programs being different from each other, each of the first programs transforming a plurality of pieces of a second input data different from the first input data to a plurality of pieces of second output data and outputting the plurality of pieces of the second output data;
among the a plurality of pieces of the second input data, outputting the second input data that maximizes an entropy of the plurality of pieces of the second output data;
each of the first programs performing the transforming by performing a plurality of processings on the first input data,
generating a graph in which the first input data is a start node, the first output data is a goal node, each of the processings is an edge, and the first input data subjected to the processings is an intermediate node;
specifying a plurality of routes capable of reaching the goal node from the start node; and
generating a second program corresponding to each of the plurality of specified routes as each of the first programs.

* * * * *